United States Patent
Griep et al.

(10) Patent No.: US 7,997,604 B2
(45) Date of Patent: Aug. 16, 2011

(54) MULTI-POSITION FOOTBOARD

(75) Inventors: David B. Griep, Rubicon, WI (US); Casey A. Ketterhagen, Milwaukee, WI (US); Michael P. McNulty, Oconomowoc, WI (US); Kurt C. Nelson, Oak Creek, WI (US); Michael DeCaluwe, Jackson, WI (US)

(73) Assignee: Harley-Davidson Motor Company Group Inc., Milwaukee, WI (US)

( * ) Notice: Subject to any disclaimer, the term of this patent is extended or adjusted under 35 U.S.C. 154(b) by 172 days.

(21) Appl. No.: 12/352,177

(22) Filed: Jan. 12, 2009

(65) Prior Publication Data

US 2010/0175942 A1    Jul. 15, 2010

(51) Int. Cl.
*B62D 25/20*    (2006.01)
*B62J 25/00*    (2006.01)

(52) U.S. Cl. .......... 280/291; 280/293; 74/564; 180/90.6

(58) Field of Classification Search .................. 280/291, 280/293; 74/564; 180/90.6
See application file for complete search history.

(56) References Cited

U.S. PATENT DOCUMENTS

| | | | |
|---|---|---|---|
| 1,261,442 A | 4/1918 | Rigby | |
| 4,174,852 A | 11/1979 | Panzica et al. | |
| 4,456,090 A | 6/1984 | Malenotti | |
| 4,458,910 A | 7/1984 | Stillwagon | |
| 4,546,993 A | 10/1985 | Walker | |
| 4,802,684 A | 2/1989 | Bennett et al. | |
| 5,090,715 A | 2/1992 | Nakajima et al. | |
| D338,643 S | 8/1993 | Fuller et al. | |
| 5,720,359 A | 2/1998 | Attenello | |
| 5,779,254 A | 7/1998 | James et al. | |
| 5,826,900 A * | 10/1998 | Steele | 280/291 |
| D405,393 S | 2/1999 | Stahel | |
| 5,997,023 A | 12/1999 | Sauter | |
| 6,217,050 B1 | 4/2001 | Dickie et al. | |
| 6,688,629 B2 | 2/2004 | Essinger | |
| 6,719,316 B1 * | 4/2004 | Anthony | 280/291 |
| 6,893,038 B2 | 5/2005 | Egan | |
| D506,707 S | 6/2005 | Egan | |
| D528,477 S | 9/2006 | Egan | |
| 7,104,356 B2 | 9/2006 | Paris | |

(Continued)

OTHER PUBLICATIONS

Adjustable Footboard Mounting Assembly for a Motorcycle, IP.com PriorArtDatabase, dated Apr. 5, 2006, 7 pages, Retrieved from https://priorart.ip.com/viewPub.jsp?pubID=IPCOM000135234D on Apr. 6, 2006.
Kurakyn Transformer Floorboards product pages, Kuryakyn.com website, undated, 7 pages, Retrieved from http://www.kukryakyn.com/products.asp?bn=honda&ci=2781 on Oct. 12, 2006.

(Continued)

*Primary Examiner* — Tony H. Winner
*Assistant Examiner* — Jacob Knutson
(74) *Attorney, Agent, or Firm* — Michael Best & Friedrich LLP (57) ABSTRACT

A footboard assembly configured to be coupled to a motorcycle supported in a vertically upright position. The footboard assembly includes a footboard and a footpeg arm. The footboard is configured to couple to the motorcycle and to support a foot of a rider. A top surface of the footboard defines a foot support plane. The footpeg arm includes an attachment portion pivotally coupled to the footboard about a pivot axis that is not parallel to the foot support plane. The footpeg arm includes a footpeg portion spaced from the attachment portion. The footpeg arm pivots about the pivot axis between a stowed position, in which the footpeg portion defines a first height and a deployed position, in which the footpeg portion defines a second height higher than the first height.

20 Claims, 8 Drawing Sheets

U.S. PATENT DOCUMENTS

| | | |
|---|---|---|
| 7,114,739 B2 | 10/2006 | Colano |
| 7,234,558 B2 | 6/2007 | Toftner |
| D560,562 S | 1/2008 | Egan et al. |
| 7,497,291 B1 * | 3/2009 | McKim .................. 180/90.6 |
| 2005/0012300 A1 | 1/2005 | Egan |
| 2007/0063479 A1 | 3/2007 | Fouhy |

OTHER PUBLICATIONS

Dressers and Roadkings 01-RH/LH for FLH '87 to Present instruction page, Pegrizer.com website, undated, 1 page, Retrieved from http://www.pegrizer.com/dresser.html on Sep. 22, 2008.

* cited by examiner

MULTI-POSITION FOOTBOARD

BACKGROUND

The present invention relates to adjustable footboards, and more particularly to multi-position footboards adapted to be coupled to motorcycles.

Some motorcycle footboards provide multiple foot positions, which some passengers find desirable for improved comfort.

SUMMARY

In one construction, the invention provides a footboard assembly configured to be coupled to a motorcycle supported in a vertically upright position. The footboard assembly includes a footboard and a footpeg arm. The footboard is configured to couple to the motorcycle and to support a foot of a rider. A top surface of the footboard defines a foot support plane. The footpeg arm includes an attachment portion pivotally coupled to the footboard about a pivot axis that is not parallel to the foot support plane. The footpeg arm includes a footpeg portion spaced from the attachment portion. The footpeg arm pivots about the pivot axis between a stowed position, in which the footpeg portion defines a first height and a deployed position, in which the footpeg portion defines a second height higher than the first height.

In another construction, the invention provides a method of adjusting a footboard assembly of a motorcycle supported in a vertically upright position. The method includes supporting a foot of a rider of the motorcycle with a footboard of the footboard assembly, a top surface of the footboard defining a foot support plane. The method includes raising a footpeg portion of a footpeg arm from a first height when the footpeg arm is in a stowed position to a second height when the footpeg arm is in a deployed position by pivoting the footpeg arm of the footboard assembly about a pivot axis that is not parallel to the foot support plane, and supporting the foot on the footpeg portion when the footpeg arm is in the deployed position.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
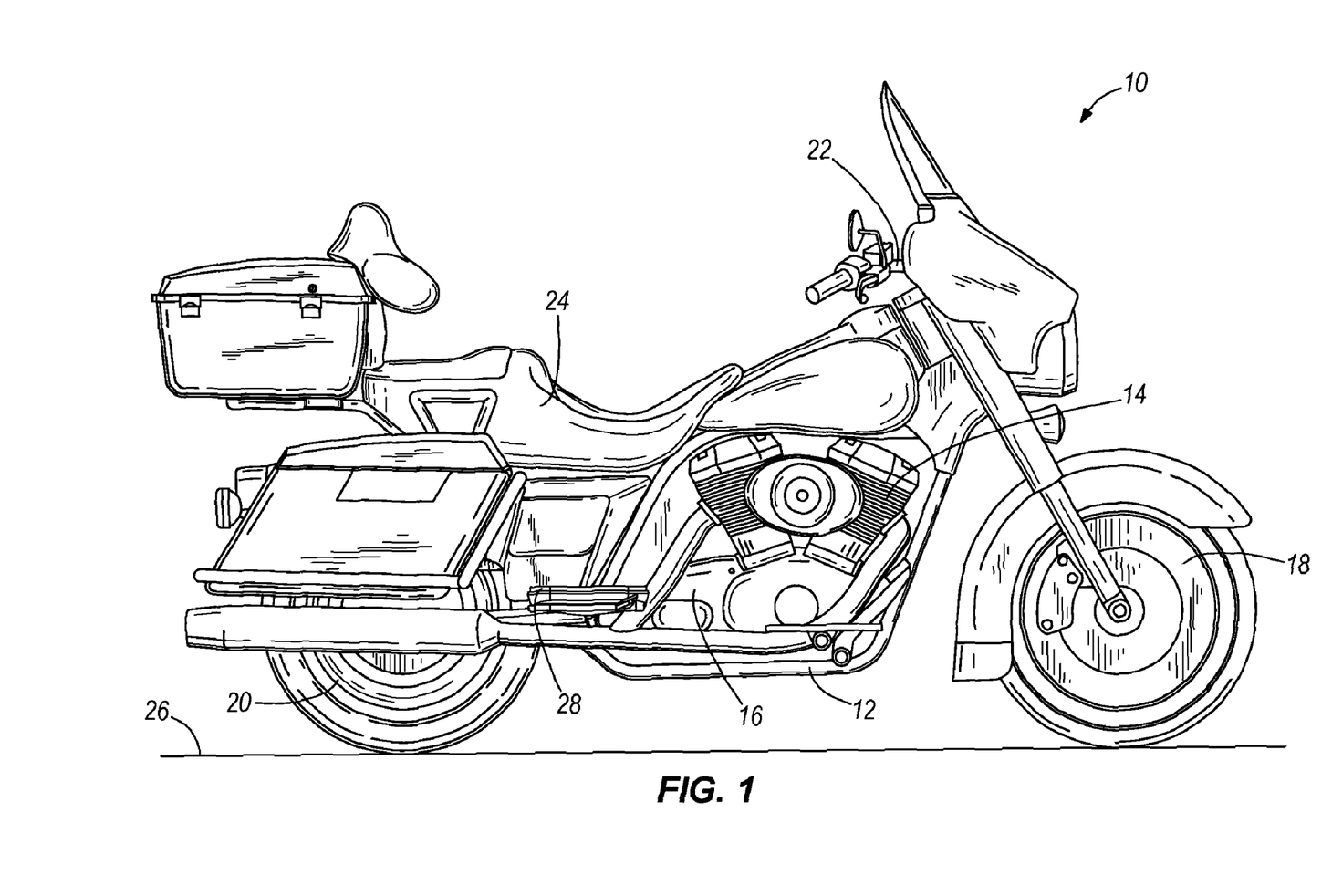
FIG. 1 is a side view of a motorcycle with one construction of a footboard assembly of the present invention.

FIG. 1 shows a motorcycle 10 that includes a frame 12 that supports an engine 14, a transmission 16, a front wheel 18, a rear wheel 20, a handlebar assembly 22, and a seat 24. The engine 14 is mounted to the frame 12 and the transmission 16 connects the engine 14 to the rear wheel 20 such that the engine 14 powers the rotation of the rear wheel 20. The motorcycle 10 is supported in a vertically upright position on a horizontal support surface 26 and includes a passenger footboard assembly 28 on which a passenger may position their foot.

It is to be understood that the motorcycle 10 includes two footboard assemblies 28 mounted on opposite sides of the motorcycle, such that the passenger may place their right foot on a right footboard assembly and their left foot on a left footboard assembly. The left and right footboard assemblies operate similarly and are substantially mirror images of each other. Only the right footboard assembly will be discussed in detail, herein referred to generally as the footboard assembly 28. Although the illustrated footboard assembly 28 is intended to be used as a passenger footboard, the footboard assembly 28 could also be used as a driver footboard, in addition to or instead of a passenger footboard. As used herein, the word rider is understood to include either a driver (i.e., an operator of the motorcycle) or a passenger.

Figure 2:
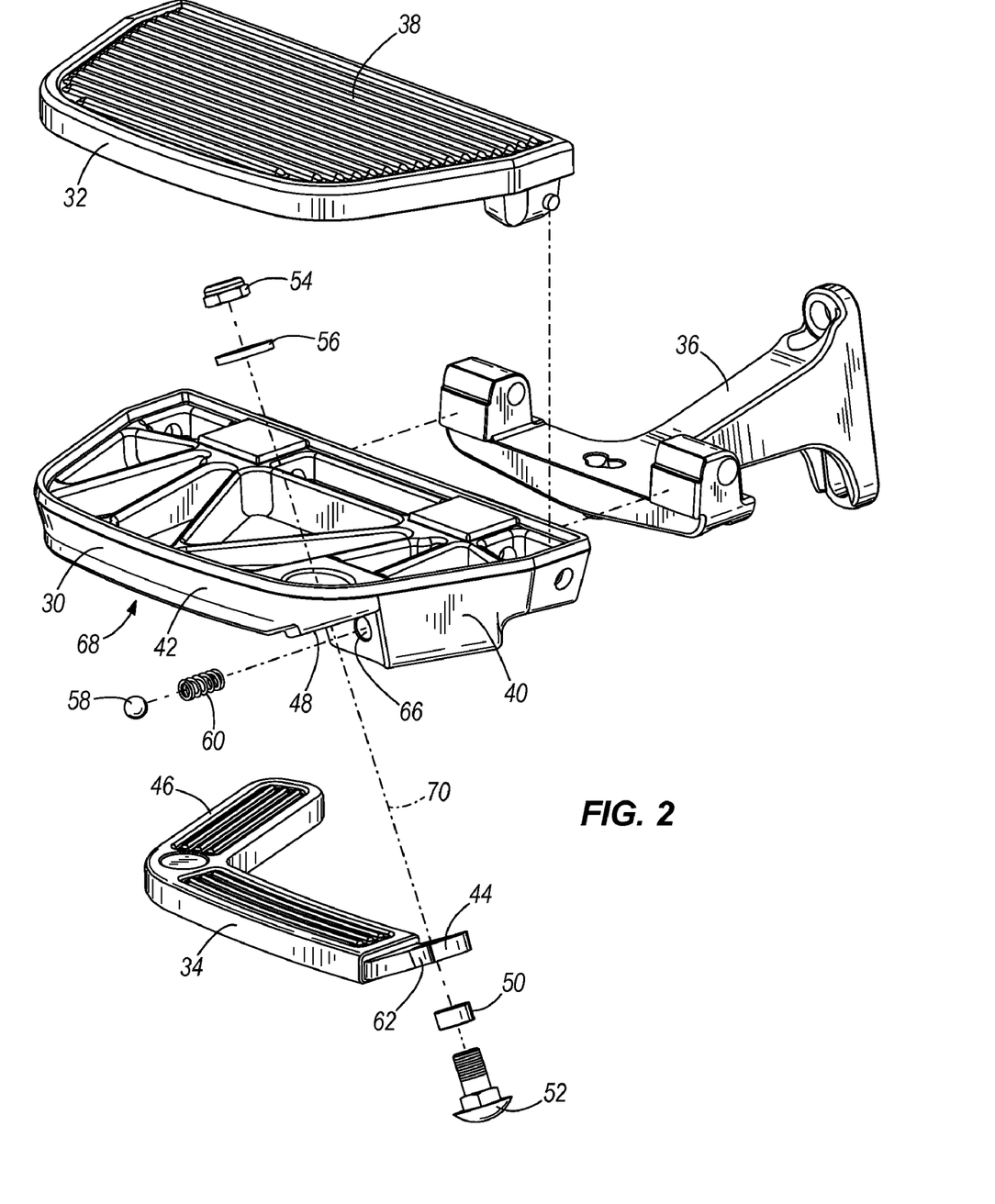
FIG. 2 is an exploded view of the footboard assembly of FIG. 1.
Figure 3:
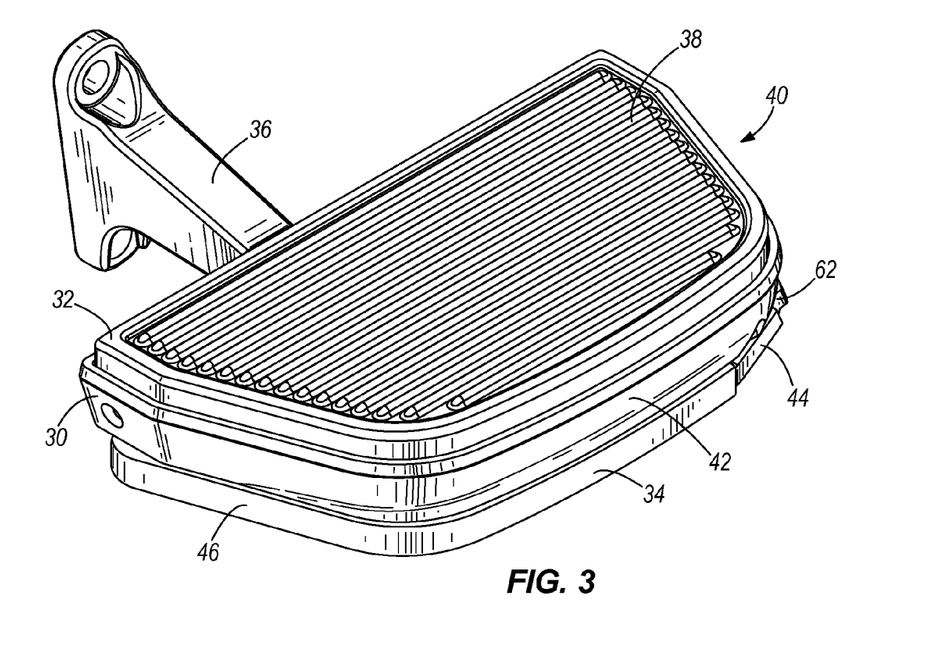
FIG. 3 is a perspective view of the footboard assembly of FIG. 1 illustrating a stowed position of the footpeg arm.

With reference to FIG. 2, the footboard assembly 28 includes a footboard base 30, a footboard cover 32, and a footpeg arm 34. A bracket 36 couples the footboard base 30 to the frame 12 of the motorcycle 10.

The footboard cover 32 is coupled to the footboard base 30 and is positioned on top of the footboard base 30 such that the rider rests a foot on the footboard cover 32 when riding on the motorcycle 10. The footboard cover 32 is formed separately from the footboard base 30. In the illustrated construction, the footboard cover 32 includes a top surface 38 defining a foot support plane 39 (FIGS. 4, 7, and 8) that is substantially parallel to the support surface 26. In other constructions, the foot support plane 39 may not be parallel to the support surface 26. In yet other constructions, the footboard cover 32 may be formed integrally with the footboard base 30, or the footboard base 30 may be formed without the footboard cover 32.

Figure 4:
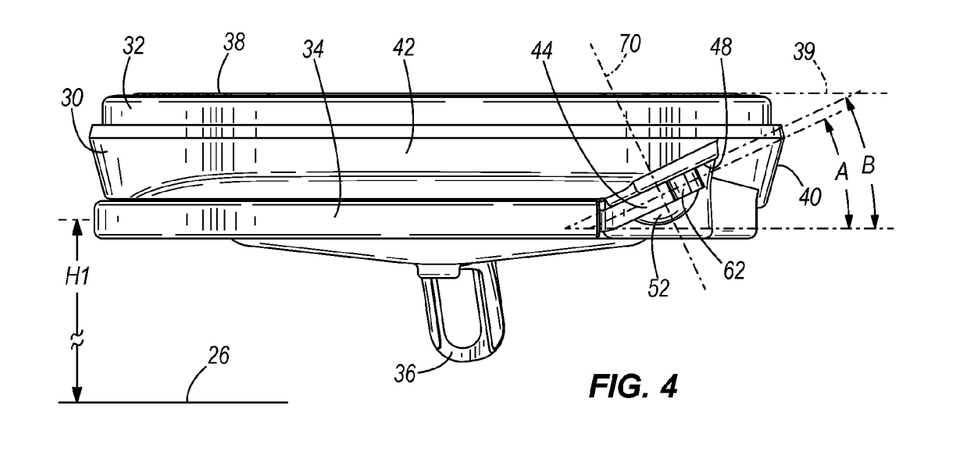
FIG. 4 is a side view of the footboard assembly of FIG. 3.

The footpeg arm 34 is pivotally coupled to the footboard base 30 at an outboard side 42 adjacent a front end 40. The footpeg arm 34 includes an attachment portion 44 near one end and a footpeg portion 46 at the opposite end. The footpeg arm 34 is formed substantially flat, with the attachment portion 44 formed at an angle A from the footpeg arm 34 and footpeg portion 46 (FIG. 4). In the illustrated construction, the attachment portion 44 defines an angle A of approximately 25 degrees. The footboard base 30 contains an attachment surface 48 defining an angle B relative to the footpeg arm 34 of approximately 25 degrees to receive the attachment portion 44 (FIG. 4). In other constructions, the attachment portion 44 and the attachment surface 48 may be formed at different angles.

The attachment portion 44 is pivotally coupled to the footboard base 30 at the attachment surface 48 via a bushing 50, a pivot bolt 52, a nut 54 and a washer 56. The attachment portion 44 and the attachment surface 48 are substantially parallel and are in sliding contact with each other. The attachment portion 44 is able to pivot about a pivot axis 70 that is perpendicular to the attachment surface 48 and not parallel to the foot support plane 39 to pivot the footpeg arm 34 from a stowed position to a deployed position, as will be described below in more detail. In constructions where the foot support plane 39 is parallel to the support surface 26, the pivot axis 70 is non-horizontal. In other constructions, the footpeg arm 34 may be coupled to the footboard base 30 by other fasteners, such as rivets, screws, etc.

In the illustrated construction, the footpeg arm 34 is formed together as one piece. In other constructions, the footpeg arm 34 may be formed as separate pieces, coupled together after they are formed. For example, the footpeg portion 46 may be attached using a second pivot bolt and bushing such that the footpeg portion 46 may pivot relative to the rest of the footpeg arm 34, allowing the footpeg portion 46 to pivot or fold into other positions. In other constructions, the footpeg portion 46 may have a different shape and size. For example, the footpeg portion 46 may be a round peg or other shape.

Figure 5:
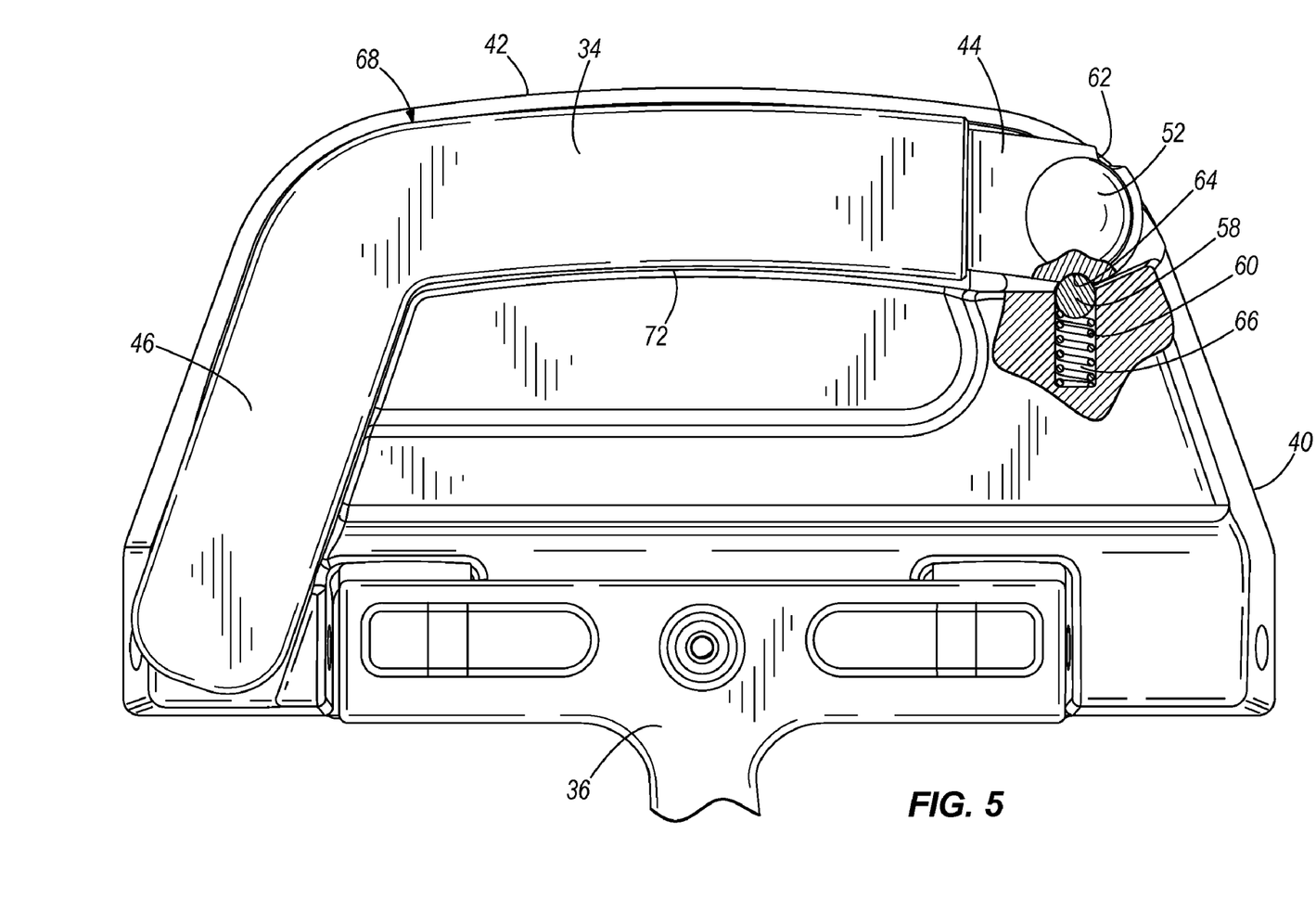
FIG. 5 is a bottom view of the footboard assembly of FIG. 3.
Figure 6:
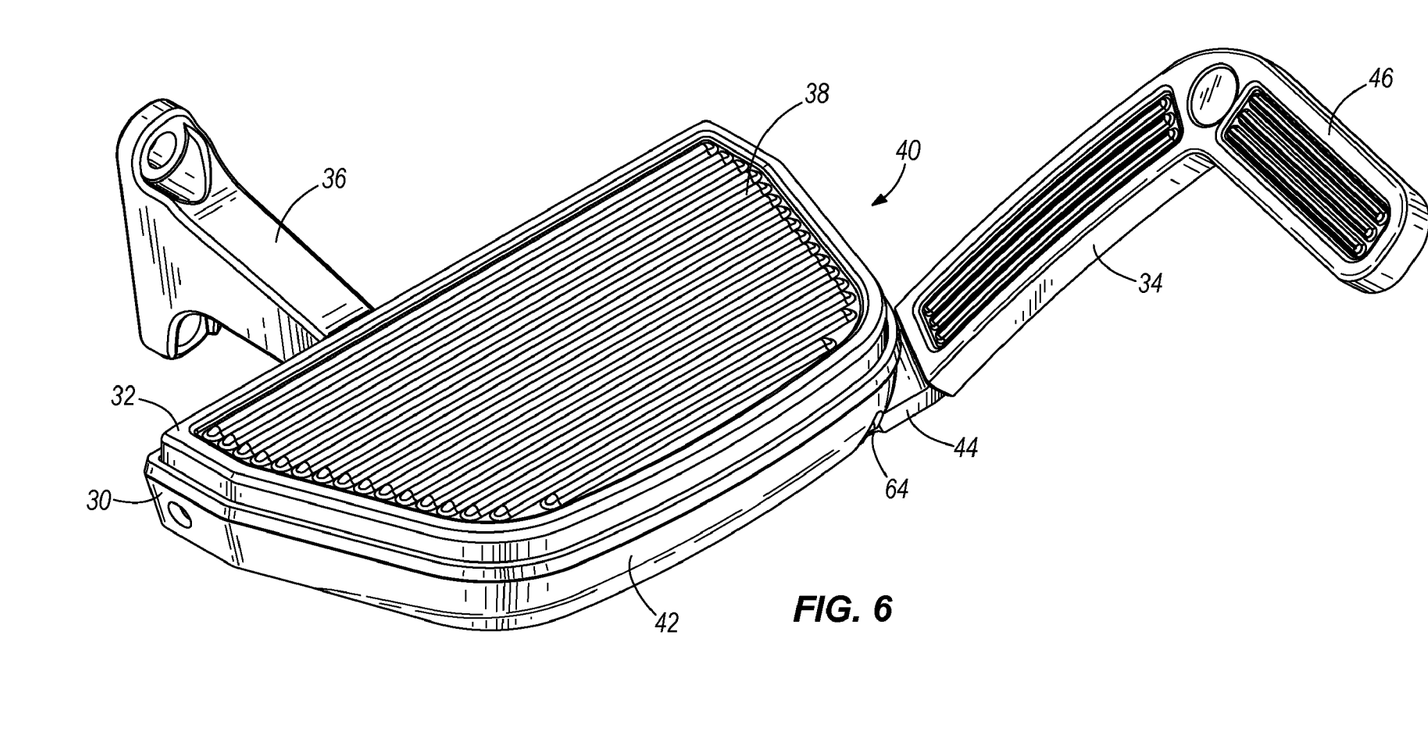
FIG. 6 is a perspective view of the footboard assembly of FIG. 1 illustrating a deployed position of the footpeg arm.

Referring to FIGS. 2 and 5, the footboard assembly 28 also includes a retention mechanism having a ball 58 and a spring 60, which cooperate with detents 62, 64 in the attachment portion 44 to releasably retain the footpeg arm 34 in both the stowed position and the deployed position. The spring 60 is positioned inside a recess 66 in the footboard base 30. The retention ball 58 is then pushed into the recess 66 such that the spring 60 compresses somewhat and resists entry of the retention ball 58 into the recess 66. When the footpeg arm 34 is attached to the footboard base 30, the attachment portion 44 is in contact with the retention ball 58 and prevents it from falling out of the recess 66. Furthermore, detents 62, 64 receive a portion of the retention ball 58 when the footpeg arm 34 is in each of the stowed and deployed positions.

More specifically, FIG. 5 illustrates the retention ball 58 and the spring 60 that cooperate with a deployed detent 62 and a stowed detent 64 (also referred to as an open detent and a closed detent). As the footpeg arm 34 is rotated about the pivot axis 70, the retention ball 58 will move into and out of contact with the detents 62, 64 in the attachment portion 44. When the retention ball 58 is in engagement with the stowed detent 64, the footpeg arm 34 is releasably held in the stowed position, as shown in FIG. 5. The user must apply force to the footpeg arm 34 in order to move the footpeg arm 34 into the deployed position. This may be accomplished in many ways including kicking the footpeg arm 34 or pulling or pushing the footpeg arm 34 by hand. When a substantial force is applied to overcome the spring force of the spring 60, the retention ball 58 will compress the spring 60 and move into the recess 66 in the footboard base 30 to allow the footpeg arm 34 to pivot. Once the footpeg arm 34 moves to the deployed position, the ball will be pushed by the spring 60 into engagement with the deployed detent 62 to hold the footpeg arm 34 in the deployed position. In this way, the footpeg arm 34 is releasably retained in either the stowed position or the deployed position.

Best shown in FIGS. 3-7, the footpeg arm 34 is pivotable about the pivot axis 70. The pivot axis 70 is parallel to the shaft of the pivot bolt 52 through the attachment portion 44 of the footpeg arm 34 such that when the footpeg arm 34 pivots from the stowed position to the deployed position, the footpeg portion 46 moves from a first height H1 (FIG. 4) to a second height H2 (FIG. 7) that is higher than the first height H1. In the illustrated construction, the footpeg portion 46 will be positioned at a second height H2 that is above the footboard in the deployed position (see FIGS. 6 and 7). In one construction, the difference between the first height H1 and the second height H2 is approximately 3-5 inches.

Figure 7:
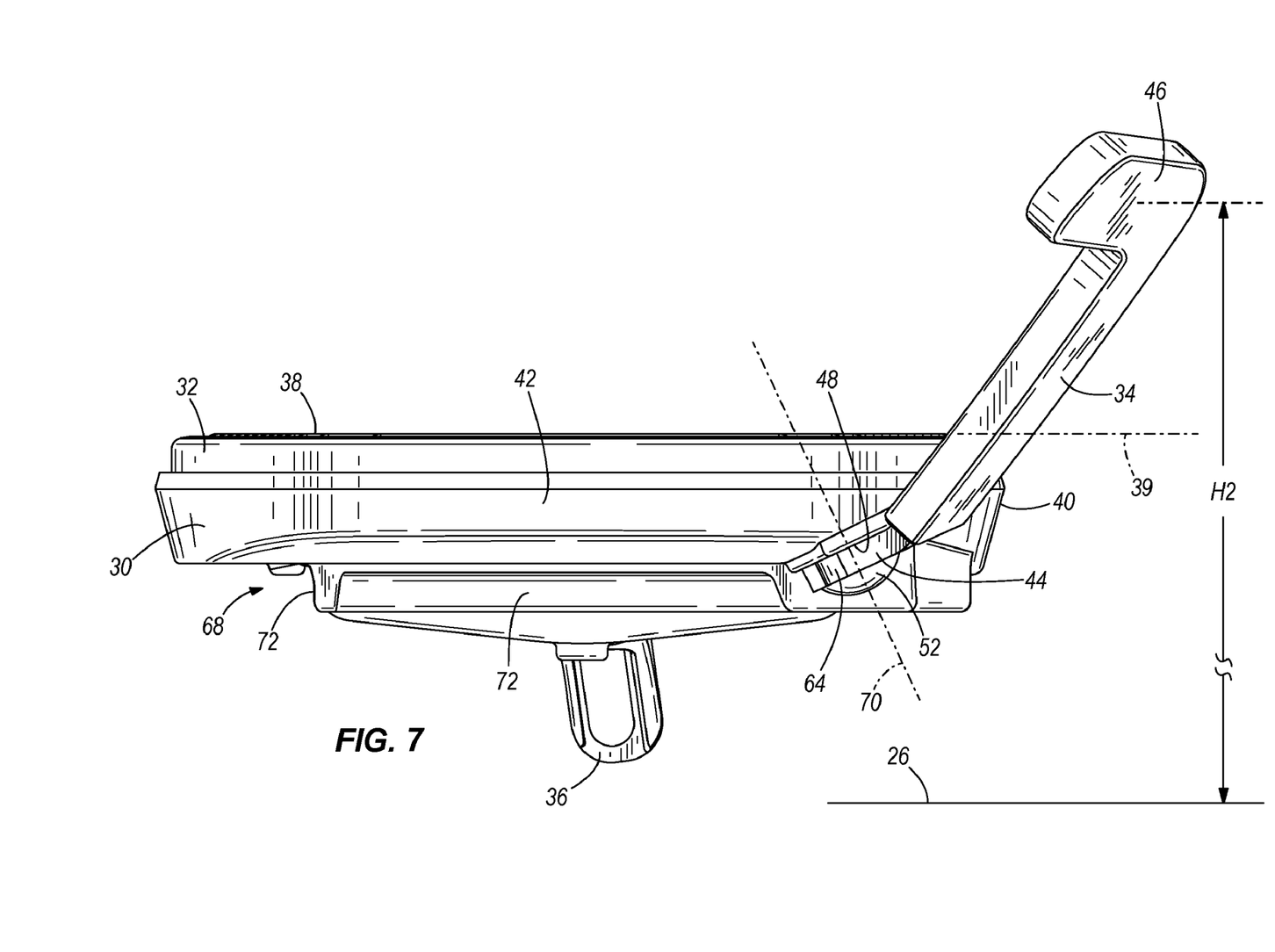
FIG. 7 is a side view of the footboard assembly of FIG. 6.

When the footpeg arm 34 is in the stowed position, the footpeg arm 34 is received in a receiving portion 68 of the footboard base 30 and is substantially contained within a perimeter of the footboard cover 32 when viewed from above. In the illustrated embodiment, the receiving portion 68 is formed in the bottom side of the footboard base 30 and is partially defined by a protruding portion 72 of the footboard base 30 (FIG. 7). When the footpeg arm 34 is received in the receiving portion 68, the footpeg arm 34 contacts the protruding portion 72, such that the footpeg arm 34 may not be rotated further than the protruding portion 72 allows. Of course, in other constructions, the receiving portion 68 may be formed in the center of the footboard base 30 such that it acts similar to a pocket to receive the footpeg arm 34. In yet other constructions, the footboard assembly 28 may not contain the receiving portion 68, and the footpeg arm 34 may be positioned adjacent the footboard base 30 and outside the perimeter of the footboard base 30 when in the stowed position.

Figure 8:
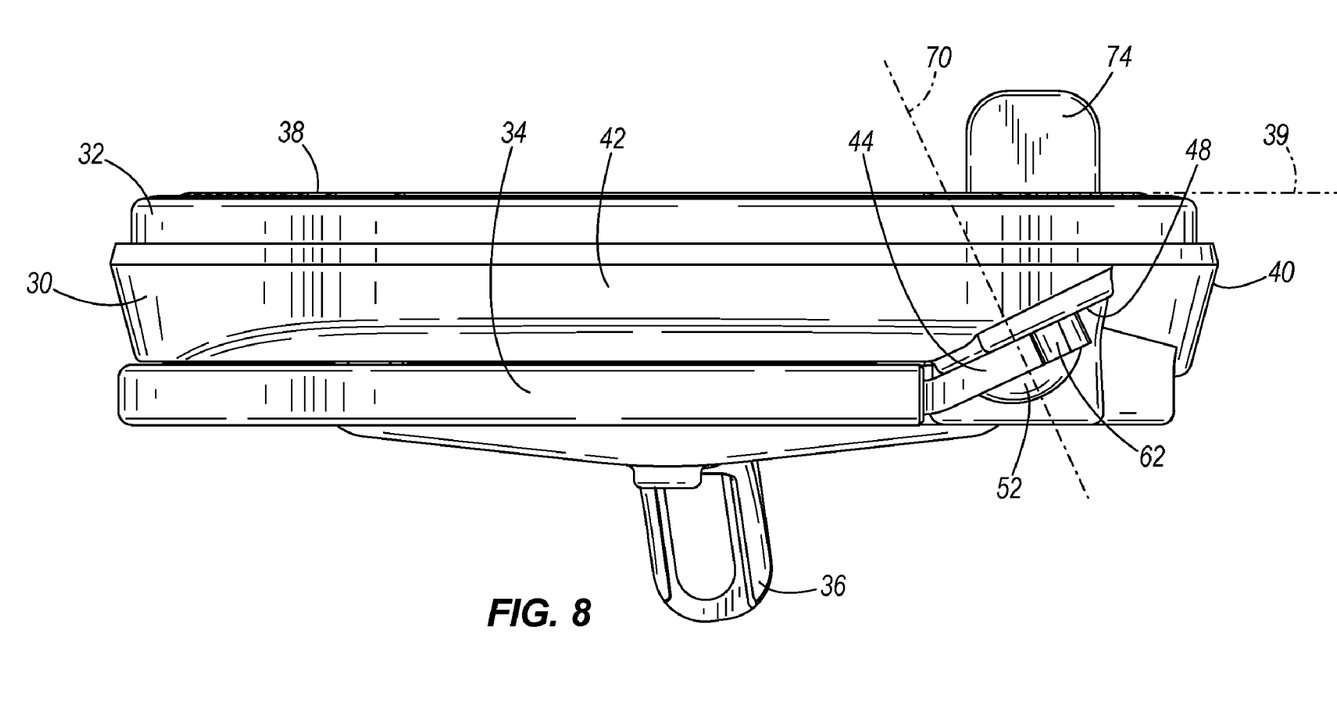
FIG. 8 is a side view of another construction of a footboard assembly of the present invention including a spring-release mechanism.
Figure 9:
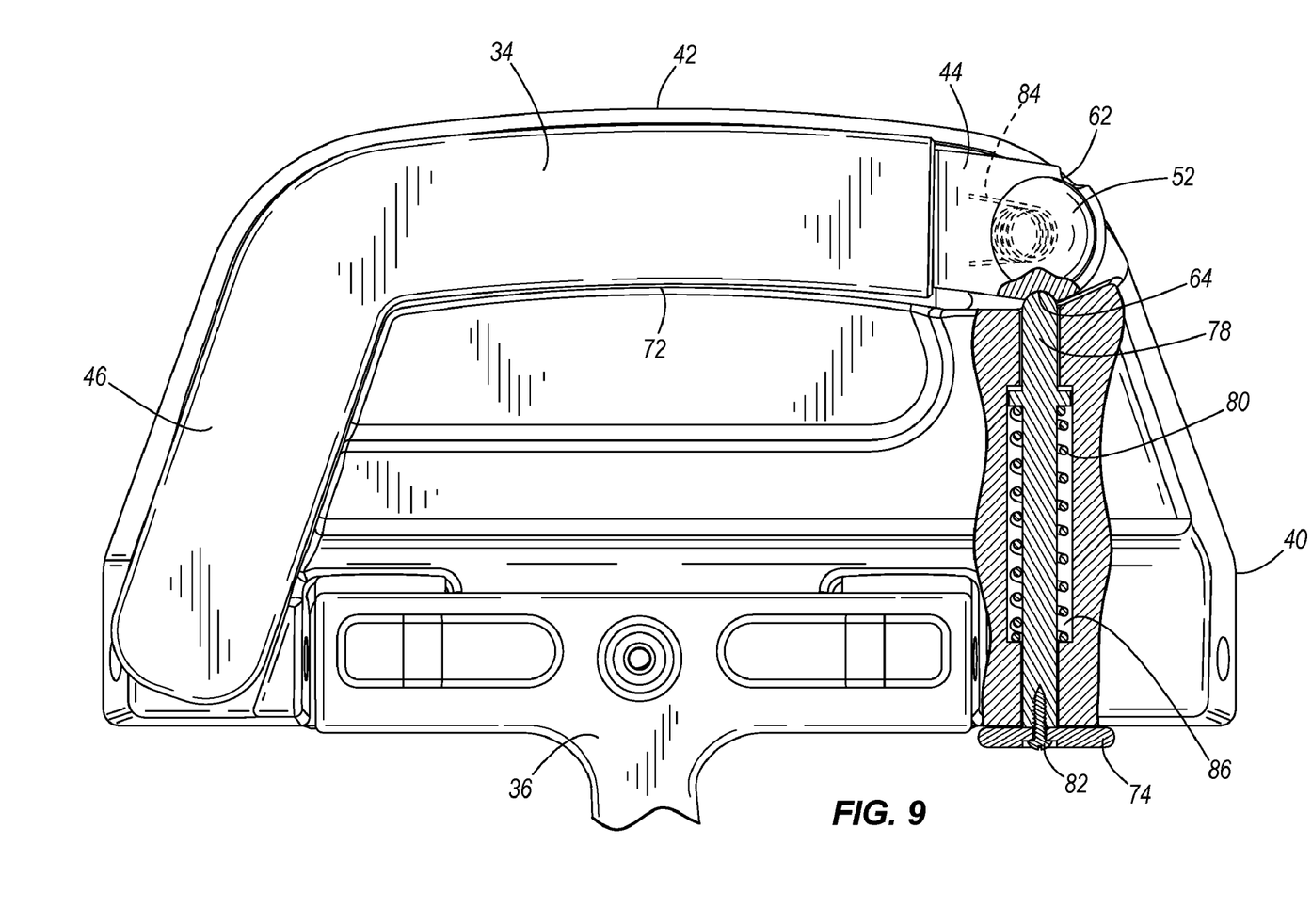
FIG. 9 is a bottom view of the footboard assembly of FIG. 8, with a portion cut away to illustrate the spring-release mechanism.

FIGS. 8 and 9 illustrate a construction of the footboard assembly 28 containing a latch tab 74 and a spring-release mechanism 76 instead of the retention ball 58 and spring 60. The footboard assembly 28 illustrated in FIGS. 8 and 9 is substantially the same as the footboard assembly 28 described with respect to FIGS. 1-7. Therefore, only the differences will be discussed in detail.

The footpeg arm 34 is coupled to the attachment surface 48 of the footboard base 30 such that the footpeg arm 34 is pivotable about the pivot axis 70 in the same manner as described above. The stowed and deployed detents 64, 62 receive a pin 78 rather than the retention ball 58. The pin 78 is biased toward the attachment portion 44 by a spring 80, much like the retention ball 58 and spring 60 described with respect to FIG. 5. A recess 86 extends through the footboard base 30 such that the pin 78 communicates with the latch tab 74 adjacent the footboard base 30. The latch tab 74 is coupled to the pin 78 by a fastener 82 (e.g., screw) such that when the user pushes the latch tab 74 inwardly toward the motorcycle, the pin 78 is also pushed toward the motorcycle, compressing the spring 80, and moving the pin 78 out of engagement with the stowed detent 64. When movement of the footpeg arm 34 is no longer restricted by the pin 78, a torsional spring 84 causes the footpeg arm 34 to automatically pivot and move to the deployed position. When the latch tab 74 is released, the pin 78 will move back into engagement with the attachment portion 44, and in particular, the pin 78 will be received in the deployed detent 62 to releasably retain the footpeg arm 34 in the deployed position.

When the rider wishes to stow the footpeg arm 34, it may be pushed back to the stowed position against the bias of the torsional spring 84 by hand or foot. As the user pushes the footpeg arm 34, the pin 78 will be moved out of engagement with the deployed detent 62 and the spring 80 will be compressed. Once the footpeg arm 34 is pivoted and in the stowed position, the pin 78 will again be received in the stowed detent 64 to releasably retain the footpeg arm 34 in the stowed position.

Thus, the invention provides, among other things, a multi-position footboard for a motorcycle 10. Various features and advantages of the invention are set forth in the following claims.

What is claimed is:

1. A footboard assembly configured to be coupled to a motorcycle supported in a vertically upright position, the footboard assembly comprising:
   a footboard configured to couple to the motorcycle and to support a foot of a rider, a top surface of the footboard defining a foot support plane; and
   a footpeg arm including an attachment portion pivotally coupled to the footboard about a pivot axis that is not parallel to the foot support plane, the footpeg arm including a footpeg portion spaced from the attachment portion,
   wherein the footpeg arm is mounted for pivoting about the pivot axis between a stowed position, in which the footpeg portion defines a first height not above the foot support plane, and a deployed position, in which the footpeg portion defines a second height higher than the first height and above the foot support plane.

2. The footboard assembly of claim 1, further comprising a retention mechanism including
   a ball and a spring coupled to one of the footboard and the attachment portion, the spring biasing the ball toward the attachment portion, and
   at least one detent in the other of the footboard and the attachment portion that at least partially receives the ball when the footpeg arm is in one of the stowed position and the deployed position to releasably retain the footpeg arm in the one of the stowed position and the deployed position.

3. The footboard assembly of claim 1, wherein the footboard further includes a receiving portion that receives the footpeg arm when the footpeg arm is in the stowed position.

4. The footboard assembly of claim 3, wherein the receiving portion defines a protruding portion that abuts the footpeg arm when the footpeg arm is in the stowed position.

5. The footboard assembly of claim 1, wherein the footboard includes a cover defining a perimeter when viewed from above, and wherein the footpeg arm is positioned within the perimeter when the footpeg arm is in the stowed position.

6. The footboard assembly of claim 1, wherein the footboard further comprises an attachment surface substantially parallel to and in sliding contact with the attachment portion, the attachment surface perpendicular to the pivot axis.

7. The footboard assembly of claim 1, wherein the footboard further comprises
   a footboard base including an outboard side and a front end when coupled to the motorcycle, and
   a footboard cover coupled to the footboard base,
   wherein the attachment portion is pivotally coupled to the footboard base at the outboard side adjacent the front end.

8. A motorcycle comprising:
   a frame;
   front and rear wheels rotatably coupled to the frame to support the frame in a vertically upright position on a horizontal support surface;
   a footboard coupled to the frame and configured to support a foot of a rider, the footboard defining a foot support plane; and
   a footpeg arm including an attachment portion pivotally coupled to the footboard about an axis that is non-parallel with the foot support plane, and a footpeg portion spaced from the attachment portion,
   wherein the footpeg arm pivots about the axis between a stowed position, in which the footpeg portion defines a first height and a deployed position, in which the footpeg portion defines a second height higher than the first height.

9. The motorcycle claim 8, further comprising a retention mechanism including
   a ball and a spring coupled to one of the footboard and the attachment portion, the spring biasing the ball toward the attachment portion, and
   at least one detent in the other of the footboard and the attachment portion that partially receives the ball when the footpeg arm is in one of the stowed position and the deployed position to releasably retain the footpeg arm in the one of the stowed position and the deployed position.

10. The motorcycle of claim 8, wherein the footboard further includes a receiving portion that receives the footpeg arm when the footpeg arm is in the stowed position.

11. The motorcycle of claim 10, wherein the receiving portion defines a protruding portion that abuts the footpeg arm when the footpeg arm is in the stowed position.

12. The motorcycle of claim 8, wherein the footboard includes a cover defining a perimeter, and wherein the footpeg arm is positioned within the perimeter when the footpeg arm is in the stowed position.

13. The motorcycle of claim 8, wherein the footboard further comprises an attachment surface, the attachment surface substantially parallel to and in sliding contact with the attachment portion, and the attachment surface perpendicular to the pivot axis.

14. The motorcycle of claim 8, wherein the footboard further comprises
   a footboard base coupled to the frame and including an outboard side and a front end, and
   a footboard cover coupled to the footboard base,
   wherein the attachment portion is pivotally coupled to the footboard base at the outboard side adjacent the front end.

15. A method of adjusting a footboard assembly of a motorcycle supported in a vertically upright position, the method comprising:
   supporting a foot of a rider of the motorcycle with a footboard of the footboard assembly, a top surface of the footboard defining a foot support plane;
   raising a footpeg portion of a footpeg arm from a first height when the footpeg arm is in a stowed position to a second height when the footpeg arm is in a deployed position by pivoting the footpeg arm of the footboard assembly about a pivot axis that is not parallel to the foot support plane; and
   supporting the foot on the footpeg portion when the footpeg arm is in the deployed position.

16. The method of claim 15, further comprising releasably retaining the footpeg arm in one of the deployed position and the stowed position.

17. The method of claim 15, further comprising receiving the footpeg arm in a receiving portion of the footboard when the footpeg arm is in the stowed position.

18. The method of claim 17, further comprising abutting the footpeg arm against a protruding portion of the footboard when the footpeg arm is in the stowed position.

19. The method of claim 15, wherein raising the footpeg portion from the first height of the stowed position to the second height of the deployed position includes raising the footpeg portion from a height that is not above the foot support plane to a height that is above the foot support plane.

20. The motorcycle of claim 8, wherein the footpeg portion is not above the foot support plane when the footpeg arm is in the stowed position, and the footpeg portion is above the foot support plane when the footpeg arm is in the deployed position.

* * * * *